United States Patent
Masuzawa et al.

(10) Patent No.: US 7,574,743 B2
(45) Date of Patent: Aug. 11, 2009

(54) METHOD FOR ENSURING SECURITY, DATA STORAGE APPARATUS, SECURITY ENSURING SERVER, AND STORAGE MEDIUM STORING PROGRAM FOR THE SAME

(75) Inventors: Yoshio Masuzawa, Okaya (JP); Takashi Hayakawa, Shiojiri (JP); Kazunori Kumakura, Hara-mura (JP); Toshio Morikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 863 days.

(21) Appl. No.: 11/109,825

(22) Filed: Apr. 20, 2005

(65) Prior Publication Data

US 2006/0015744 A1 Jan. 19, 2006

(30) Foreign Application Priority Data

| Apr. 26, 2004 | (JP) | ............................. 2004-129833 |
| Jul. 8, 2004 | (JP) | ............................. 2004-201820 |
| Mar. 24, 2005 | (JP) | ............................. 2005-086353 |

(51) Int. Cl.
*G06F 11/00* (2006.01)

(52) U.S. Cl. .............................. 726/24; 726/22; 726/23

(58) Field of Classification Search .................... 726/22, 726/23, 24

See application file for complete search history.

(56) References Cited

FOREIGN PATENT DOCUMENTS

| JP | A 9-319574 | 12/1997 |
| JP | A 2002-373144 | 12/2002 |
| JP | A 2003-303028 | 10/2003 |

OTHER PUBLICATIONS

Enhanced Security Scheme for Managing Heterogeneous Server Platforms Jiho Kim; Duhyun Bae; Sehyun Park; Ohyoung Song; Computational Intelligence and Security, 2006 International Conference on vol. 2, Nov. 3-6, 2006 pp. 1381-1384.*

Integrating Java-based mobile agents into Web servers under security concerns Fuenfrocken, S.; System Sciences, 1998., Proceedings of the Thirty-First Hawaii International Conference on vol. 7, Jan. 6-9, 1998 pp. 34-43 vol. 7.*

Assessing and Comparing Security of Web Servers Mendes, N.; Neto, A.A.; Duraes, J.; Vieira, M.; Madeira, H.; Dependable Computing, 2008. PRDC '08. 14th IEEE Pacific Rim International Symposium on Dec. 15-17, 2008 pp. 313-322.*

* cited by examiner

*Primary Examiner*—David Y Jung
(74) *Attorney, Agent, or Firm*—Oliff & Berridge, PLC (57) ABSTRACT

A method for ensuring security and a data storage apparatus that enable an efficient security check on a notebook PC or like that are taken outside are provided. By executing a program that is read from the data storage apparatus, the processing for determining whether or not a piece of security ensuring data is applied; reading the piece of security ensuring data that is determined to be applied; and applying the same to a predetermined program in a terminal is executed.

11 Claims, 5 Drawing Sheets

| TYPE OF OS (GENERAL CONFIGURATION) | TYPE OF SECURITY ENSURING DATA | | AUDIT ITEM OF DATA STORAGE APPARATUS | |
|---|---|---|---|---|
| | SECURITY PACK | SECURITY PATCH | SECURITY PACK | SECURITY PATCH |
| OS-a | — | PATCH A | DISABLE | ENABLE |
| OS-b | PACK1, PACK2 | PATCH B | ENABLE | ENABLE |
| OS-c | PACK1 | PATCH C | ENABLE | ENABLE |

METHOD FOR ENSURING SECURITY, DATA STORAGE APPARATUS, SECURITY ENSURING SERVER, AND STORAGE MEDIUM STORING PROGRAM FOR THE SAME

BACKGROUND OF THE INVENTION

1. Field of the Invention

The present invention relates to a method for ensuring security, to a data storage apparatus, to a security ensuring server, and to a storage medium storing a program for these, which ensure and maintain security of a computer having a possibly of computer virus infection or compromised security.

Priority is claimed on Japanese Patent Application No. 2004-129833, filed Apr. 26, 2004, Japanese Patent Application No. 2004-201820, filed Jul. 8, 2004, and Japanese Patent Application No. 2005-086353, filed Mar. 24, 2005, the contents of which are incorporated herein by reference.

2. Description of Related Art

In recent years, with the advancement of the information technology, there are often cases where an employee disconnects his or her mobile terminal, such as a notebook PC, from the corporate system, takes the PC outside of the office, and connects the terminal to an external communication network for doing work. One technique to check the security of such notebook PCs is disclosed in Japanese Unexamined Patent Application, First Publication No. H09-319574.

In such a scenario, since the notebook PC is frequently connected to the corporate network after being taken outside and used for doing work, in order to ensure the security of the corporate communication network system, a system is required which facilitates to check notebook PCs taken outside from the company. However, more and more notebook PCs may be taken outside as the number of employees increases, and such security checks on notebook PCs is required to be executed more frequently.

SUMMARY OF THE INVENTION

Accordingly, the present invention is directed to provide a method for ensuring security, a data storage apparatus, a security ensuring server, and a storage medium storing a program for the same which facilitate efficient security checks on notebook PCs that have been taken outside.

The present invention was conceived to solve the above-described issues, and a first aspect of the present invention is a data storage apparatus that is connected to a terminal having a computer and stores a program executed by the computer of the terminal, the program making the computer execute the processing for: reading from the data storage apparatus a security ensuring data list listing an attribute of security ensuring data that is to be applied to a predetermined program of programs stored in the terminal; and determining, by executing a program read from the data storage apparatus, whether or not the piece of security ensuring data described in the security ensuring data list is applied to the predetermined program stored in the terminal by comparing an attribute of the piece of security described data described in the security ensuring list associated with information on the predetermined program and an attribute of security ensuring data that has been applied to the predetermined program stored in the terminal; and reading, when it is determined that the piece of security ensuring data described in the security ensuring data list is not applied to the predetermined program stored in the terminal, that security ensuring data from the data storage apparatus by executing a program read from the data storage apparatus; and applying, by executing a program read from the data storage apparatus, the read security ensuring data to the predetermined program stored in the terminal.

In this manner, a predetermined program in the terminal can be checked by simply connecting the data storage apparatus to the terminal.

According to a second aspect of the present invention, the data storage apparatus may further store a program executed by the computer of the terminal, the program making the computer execute the processing for: creating a list of the piece of security ensuring data that has been determined as not being applied; and instructing, before applying the piece of security ensuring data, to display the generated list of unapplied security ensuring data on the display unit, and to read from the data storage apparatus only security ensuring data that is selected to be applied in the list.

In this manner, the user can select security ensuring data to be applied to the terminal.

According to a third aspect of the present invention, the data storage apparatus may further store a program executed by the computer of the terminal, the program making the computer execute the processing for: obtaining, after applying the piece of security ensuring data that has been determined as not being applied, attribute information of the terminal and outputting the information to the data storage apparatus.

In this manner, information on the terminal that has been underwent security check can be maintained for future use for administrative tasks.

Furthermore, a fourth aspect of the present invention is a method for ensuring security of a computer of a terminal to which a data storage apparatus is connected, including: reading a check program from the data storage apparatus; reading, based on a list reading unit executing the check program, a security ensuring data list listing an attribute of security ensuring data to be applied to a predetermined program; determining, based on an application determination unit executing the check program, whether or not the piece of security ensuring data described in the security ensuring data list is applied to the predetermined program of programs stored in the terminal by comparing an attribute of the piece of security ensuring data described in the security ensuring list associated with information on the predetermined program stored in the data storage apparatus and an attribute of the piece of security ensuring data of the predetermined program that is applied to the terminal; reading, when it is determined that the piece of security ensuring data described in the security ensuring data list is not applied to the predetermined program stored in the terminal, that security ensuring data from a storage medium based on a data reading unit executing the check program; and applying, based on an applying program application unit executing the check program, the read security ensuring data to the predetermined program stored in the terminal.

Furthermore, according to a fifth aspect of the present invention, a security ensuring server may includes: a connection detection unit that detects a connection of a data storage apparatus that stores a list of an attribute of security ensuring data to be applied to a predetermined program stored in the terminal for each predetermined program and respective security ensuring data corresponding to the attribute; a latest information storage unit that stores a latest one of the list and a latest one of the piece of security ensuring data; and a latest information transmission unit that, when the list and the piece of security ensuring data stored in the detected data storage apparatus do not match corresponding information stored in the latest information storage unit, sends the data storage apparatus the list and the piece of security ensuring data stored in that latest information storage unit.

In this manner, information stored in the data storage apparatus, such as stored security ensuring data, can be maintained up-to-date.

Furthermore, according to a sixth aspect of the present invention, the security ensuring server may further includes: a managed information storage unit that stores an attribute of a data storage apparatus to be managed; and a managed data storage apparatus determination unit that, when the attribute read from the data storage apparatus and an attribute of the data storage apparatus stored in the managed information storage unit do not match, that quits sending the list and the piece of security ensuring data.

In this manner, it is possible to manage only data storage apparatuses that are to be managed.

Furthermore, according to a seventh aspect of the present invention, the security ensuring server may further includes an attribute storage unit that stores an attribute read from the data storage apparatus.

Furthermore, according to an eighth aspect of the present invention, the security ensuring server may further includes a deletion unit that deletes predetermined information stored in the data storage apparatus.

Furthermore, according to a ninth aspect of the present invention, the security ensuring server may further includes a virus check unit that checks each file stored in the data storage apparatus when a connection of the data storage apparatus is detected.

In this manner, the security of information stored in the data storage apparatus can be maintained.

Furthermore, a tenth aspect of the present invention is a storage medium for storing a program executed by a computer of a security ensuring server, the program making the computer execute the processing for: detecting a connection of a data storage apparatus that stores information of a list of an attribute of security ensuring data to be applied to a predetermined program stored in the terminal for each predetermined program and respective security ensuring data corresponding to the attribute; sending, when the list and the piece of security ensuring data stored in the detected data storage apparatus do not match corresponding information stored in a latest information storage unit that stores the latest list and the latest security ensuring data, the data storage apparatus the list and the piece of security ensuring data in that latest information storage unit.

Furthermore, an eleventh aspect of the present invention is a method for ensuring security of a security ensuring server, including: detecting a connection of a data storage apparatus that stores information of a list of an attribute of security ensuring data to be applied to a predetermined program stored in the terminal for each predetermined program and respective security ensuring data corresponding to the attribute; storing, by a latest information storage unit, a latest one of the list and a latest one of the piece of security ensuring data; and sending, by a latest information transmission unit, when the list and the piece of security ensuring data stored in the detected data storage apparatus do not match corresponding information stored in the latest information storage unit, the data storage apparatus the list and the piece of security ensuring data stored in that latest information storage unit.

DETAILED DESCRIPTION OF THE INVENTION

A security ensuring system according to an embodiment of the present invention will now be described with reference to the drawings. However, it should not be construed that the present invention is limited to those embodiments; rather, components of those embodiments, for example, may be combined if necessary.

Figure 1:
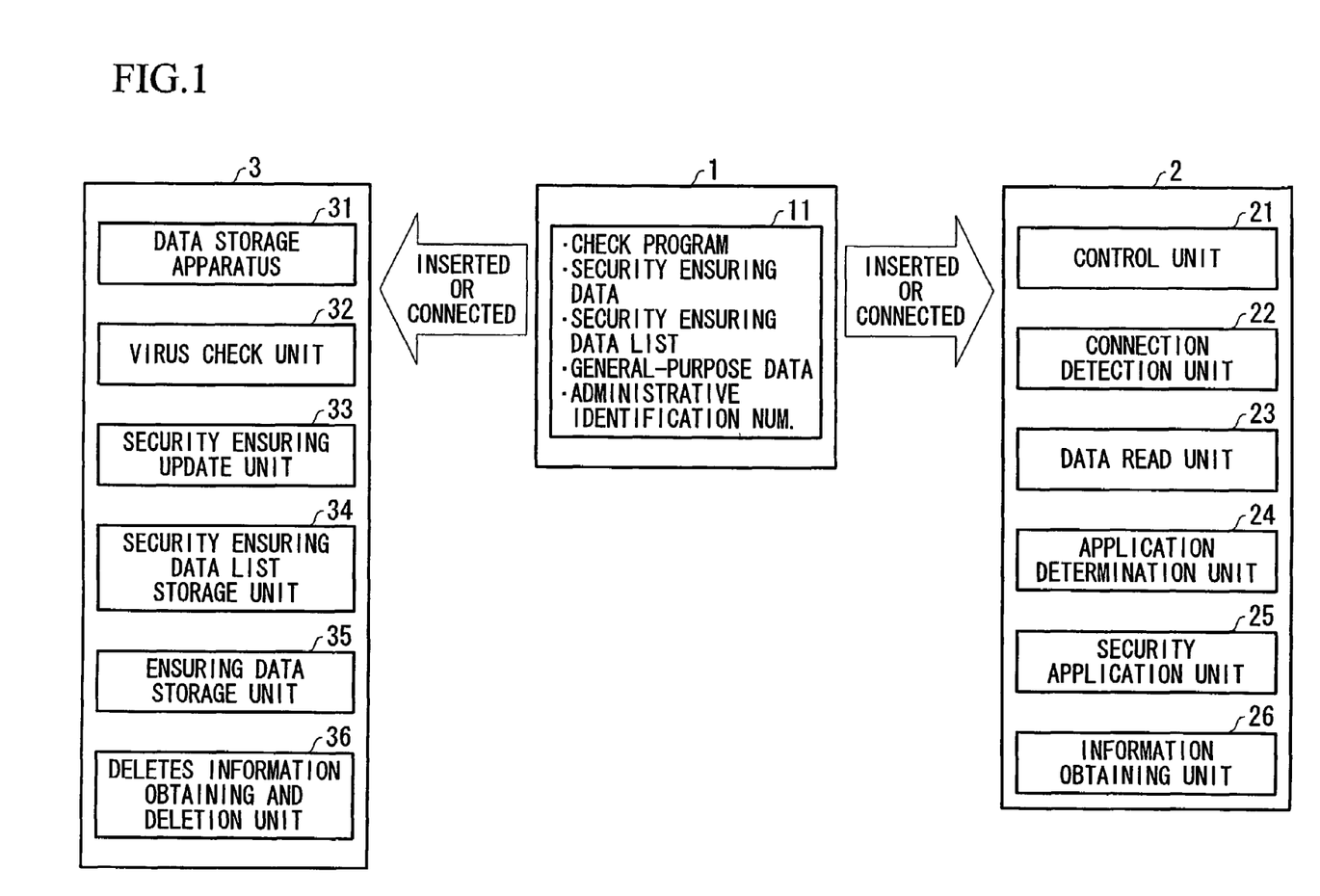
FIG. 1 is a block diagram illustrating a configuration of a security ensuring system.

FIG. 1 is a block diagram illustrating a configuration of a security ensuring system according to this embodiment.

In this figure, the reference numeral 1 refers to a data storage apparatus that has a function to transfer data stored in the data storage apparatus to a terminal in accordance with any of the data communication standards, such as USB (Universal Serial Bus) by using a USB memory, for example. Furthermore, the reference numeral 2 refers to a terminal that checks the security status of this terminal by reading various programs and data stored in the data storage apparatus 1 and executing the programs. In addition, the reference numeral 3 refers to an administrative server that checks security of the data storage apparatus 1 to be secured.

Furthermore, in the data storage apparatus 1, the reference numeral 11 refers to a storage unit that stores a check program, security ensuring data, a security ensuring data list, general-purpose data, and administrative identification numbers. This check program is a program that checks the security status of the terminal 2 when read into and executed on the terminal 2. The security ensuring data are data for enhancing the security of the terminal 2 to which the data storage apparatus 1 is connected, such as data for enhancing an OS (operating system) or application programs (for example, for update programs for the anti-virus programs or functions of the OS). Furthermore, the general-purpose data is general data used by the user by means of application software. The administrative identification numbers are numbers used by the administrative server 3 for administrating the data storage apparatus 1.

Furthermore, in the terminal 2, the reference numeral 21 refers to a control unit that controls various processing units in the terminal 2. In addition, the reference numeral 22 refers to a connection detection unit that detects a connection of the data storage apparatus 1. When the data storage apparatus 1 is a USB memory, for example, a USB interface provided in the terminal 2 or a USB hub connected to this interface may detect a connection of a USB memory when this USB memory is connected. In addition, a data read unit 23 executes the processing for reading various kinds of information stored in the data storage apparatus 1. Furthermore, the reference numeral 24 refers to an application determination unit that determines whether or not a piece of security ensuring data should be applied to a predetermined program stored in the terminal 2. The reference numeral 25 executes the processing for applying the piece of security ensuring data to the predetermined program that has been determined that the piece of security ensuring data should be applied to. It should be noted that the terms "applying a piece of security ensuring data to the predetermined program" refers to updating programs of the OS using that piece of security ensuring data when the piece of security ensuring data is a program (e.g., a patch) for updating the OS. Alternatively, when the piece of security ensuring data is an anti-virus program, the term refers to updating a predetermined application program to which the anti-virus program is to be applied with the anti-virus program. Furthermore, the reference numeral 26 is an information obtaining unit that executes the processing for obtaining certain information stored in the data storage apparatus 1.

Furthermore, in the administrative server, the reference numeral 31 refers to a connection detection unit that detects a connection of the data storage apparatus 1. When the data storage apparatus 1 is a USB memory, for example, as in the case described above, when a USB memory is connected to a USB interface provided in the administrative server 3 or a USB hub connected to this interface, the connection detection unit executes the processing for detecting this connection. The reference numeral 32 refers to a virus check unit that checks whether or not a virus program is contained in information stored in the data storage apparatus 1. Furthermore, the reference numeral 33 refers to an update execution unit that updates pieces of security ensuring data, a security ensuring data list, or a check program stored in the data storage apparatus 1 to latest ones. The reference numeral 34 refers to a security ensuring data list storage unit that stores a list of security ensuring data. The reference numeral 35 refers to an ensuring data storage unit that stores security ensuring data. The reference numeral 36 refers to an information obtainment and deletion unit that stores and deletes predetermined data in the data storage apparatus 1.

In this system, in response to the data storage apparatus 1 being connected to the terminal 2, a security check program stored in the data storage apparatus 1 is load to the terminal 2, and this check program checks the security status of the data storage apparatus 1. When the security status is not satisfactory, the processing for enhancing the security level is executed on the terminal 2. Furthermore, in order to prevent the terminal 2 from being infected by a virus due to compromised security of the data storage apparatus 1, the data storage apparatus 1 is connected to the administrative server 3, and the security of the data storage apparatus 1 is checked. In the following, the processing will be explained.

Figure 2:
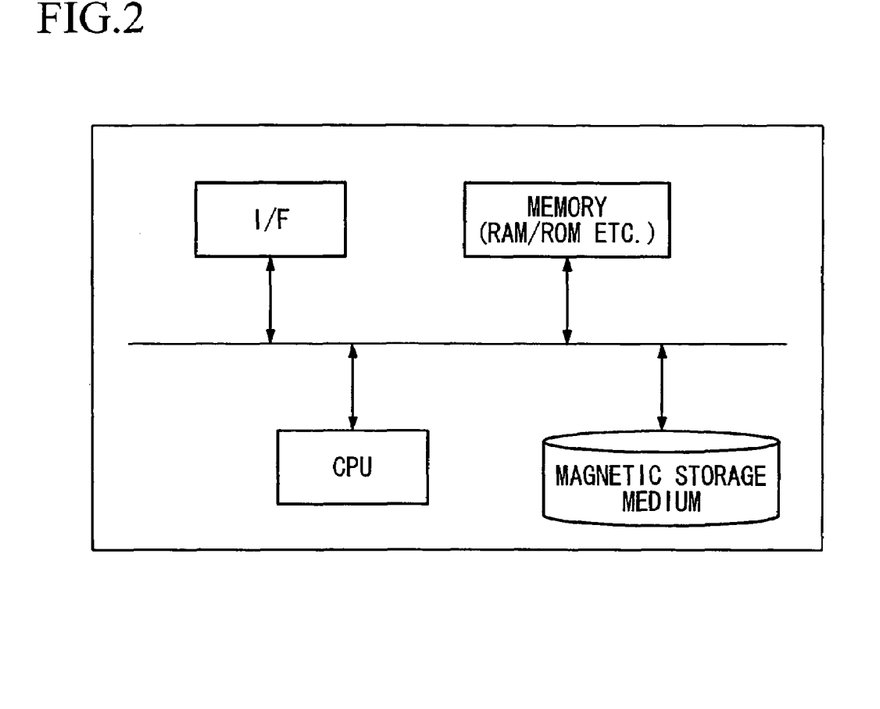
FIG. 2 is a diagram illustrating a hardware configuration of a terminal and an administrative server.

FIG. 2 is a diagram illustrating a hardware configuration of the terminal and the administrative server.

As can be seen from this figure, the terminal 2 and the administrative server 3 include hardware components as shown in FIG. 2. Such system configuration includes, for example, a CPU (Central Processing Unit), a RAM (Random Access Memory)/ROM (read only Memory), an HDD (Hard Disk Drive), an I/F (interface), and the like. In the case of the terminal 2, the CPU loads information from the data storage apparatus 1 via the I/F, stores the information into the RAM/ROM, and executes functions of each of the application determination unit 24, the security application unit 25, and the information obtaining unit 26. In the case of the administrative server 3, for example, the CPU loads a program stored in the HDD to the RAM/ROM, and executes functions of each of the connection detection unit 31, the virus check unit 32, and the update execution unit 33. Furthermore, the security ensuring data list storage unit 34 and the ensuring data storage unit 35 in the administrative server 3 are embodied in the HDD.

Figure 3:
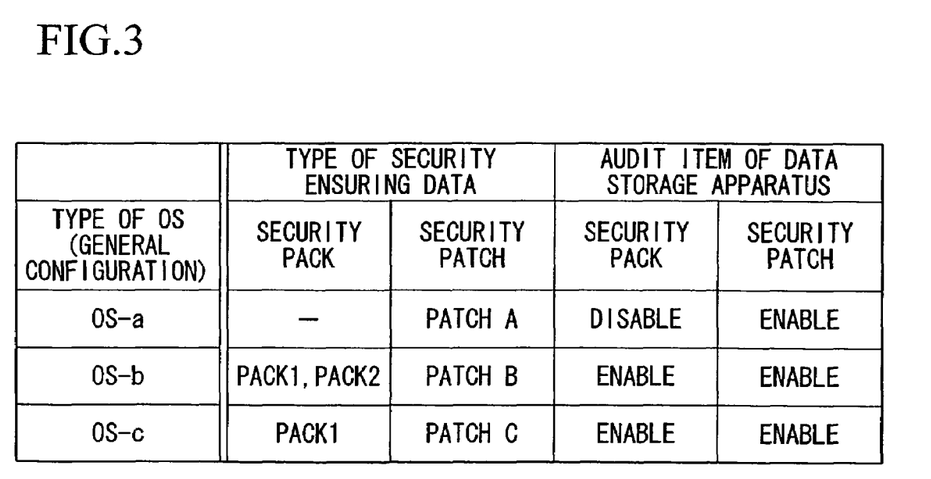
FIG. 3 is a diagram illustrating a data structure of a security ensuring data list information.

FIG. 3 is a diagram illustrating a data structure of the security ensuring data list.

As shown in this figure, the security ensuring data list lists types of OS (the general configuration of terminals), types of pieces of security ensuring data, and items to be audited for the data storage apparatus 1, which are related each other. It can be seen from the example shown in FIG. 3 that pieces of security ensuring data are security packs and security patches, which are latest security ensuring programs for the OS. The columns titled "TYPE OF SECURITY ENSURING DATA" lists pieces of security ensuring data to be applied to the terminal 2. It should be noted that although pieces of security ensuring data may also be upgrade programs for virus check software installed in this terminal, pieces of security ensuring data include two types of program data, i.e., security packs and security patches in this embodiment. It should be noted that in the present invention, "an attribute of a piece of security ensuring data" refers to an attribute the piece of security ensuring data has, such as the type of the OS or the audit items of the data storage apparatus shown in FIG. 3.

Figure 4:
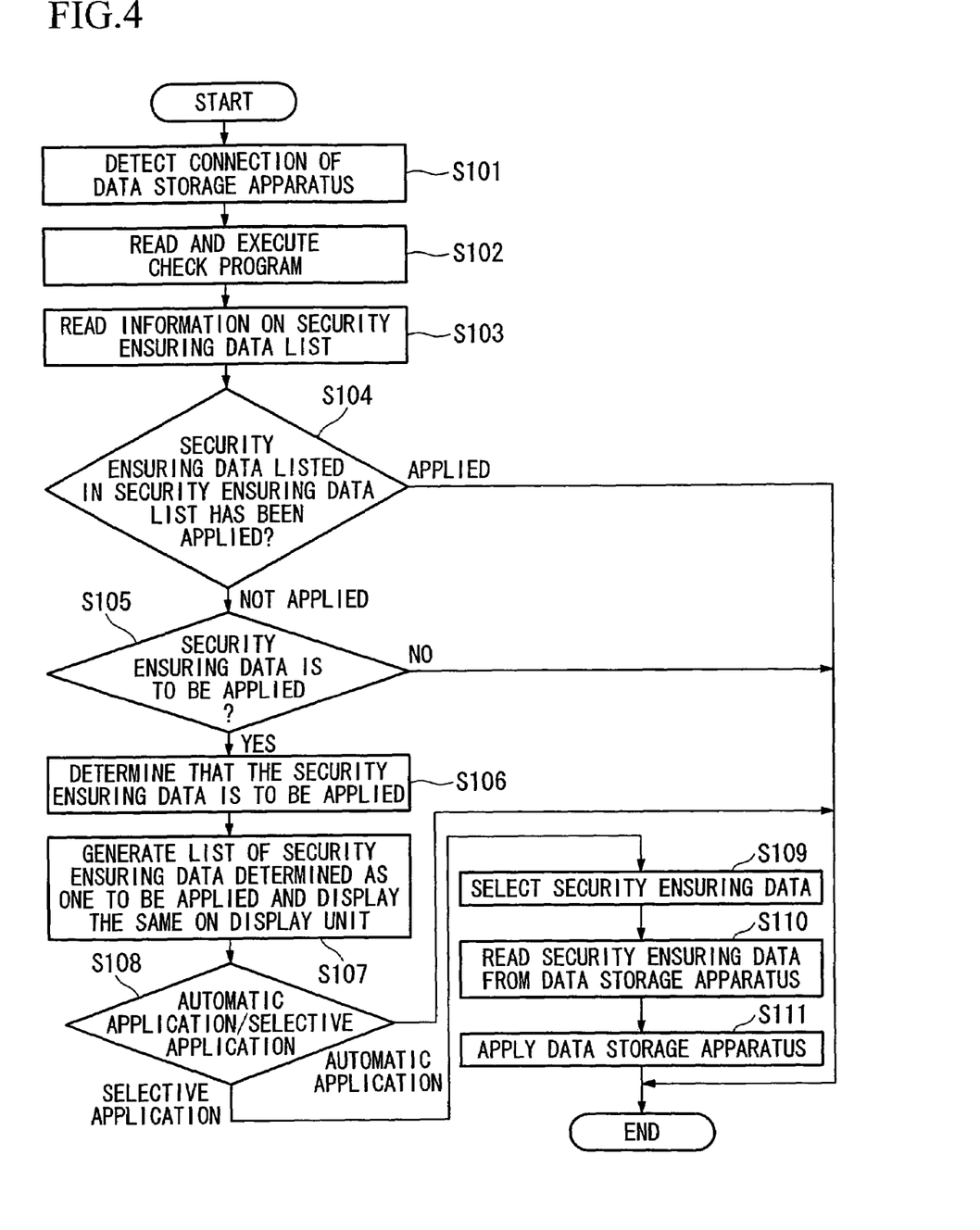
FIG. 4 is a diagram illustrating a processing flow of a security check on a terminal.

FIG. 4 is a diagram illustrating a processing flow of a security check on the terminal.

Next, a processing flow of a security check on the terminal 2 will be explained with reference to FIG. 4.

First, in response to the data storage apparatus 1 being connected to the terminal 2, the connection detection unit 22 in the terminal 2 detects this connection (step S101), mounts the data storage apparatus 1 on the terminal 2, and displays information stored on the storage unit 11 in the data storage apparatus 1 on a display unit. When the user selects a check program displayed on the display unit and instructs an execution thereof, the data read unit 23 reads a check program from the data storage apparatus 1 and the control unit 21 executes the program (step S102). In this manner, functions of the application determination unit 24, the security application unit 25, and the information obtaining unit 26 of the terminal 2 are implemented in the terminal 2.

After the startup of the check program, the application determination unit 24 instructs the data read unit 23 to read a security ensuring data list from the storage unit 11 in the data storage apparatus 1, and the data read unit 23 reads the security ensuring data list (step S103). Then, the application determination unit 24 detects the type of the OS of the terminal 2 and pieces of security ensuring data (security packs, or security patches, or the like) that have been applied to the OS by checking attributes of the programs of the OS, such as version information. The application determination unit 24 then determines whether or not all pieces of security ensuring data described in the security ensuring data list have been applied to by comparing the types of the pieces of security ensuring data described in the security ensuring data list and the pieces of security ensuring data that have been already applied to the OS of the terminal 2 (step S104). Then, it is determined whether or not a piece of security ensuring data of the security pack or the security patch is the one to be applied (i.e., disabled or enabled) by checking the security ensuring data list (step S105), and a piece of security ensuring data that has not been applied to but is enabled is determined as the piece of security ensuring data to be applied to the terminal 2 (step S106).

The application determination unit 24 then generates an application candidate screen that lists pieces of security ensuring data that have been determined to be applied, and displays the list on the display unit (step S107). The application candidate screen displayed on the display unit includes, for example, a list of candidate pieces of security ensuring data for being applied to the terminal 2, check boxes for selecting pieces of security ensuring data, and a button for selecting between the automatic application and the selective application. Then, upon selecting between the automatic application and the selective application (step S108), when the user depresses a button corresponding to automatic application displayed on the display unit with a mouse, the application determination unit 24 instructs the data read unit 23 to reads all of the pieces of security ensuring data displayed on the application candidate screen from the data storage apparatus 1.

In addition, when any of the check boxes corresponding to a piece of security ensuring data is clicked (step S109) and the button of the selective application is depressed, the application determination unit 24 instructs the data read unit 23 to read selected pieces of security ensuring data. Then, the data read unit 23 reads the pieces of security ensuring data that the application determination unit 24 has instructed it to read from the data storage apparatus 1 (step S110). Then, the security application unit 25 executes the processing for applying the pieces of security ensuring data read by the data read unit 23 to the OS of the terminal 2 (step S111). In this manner, since latest pieces of security ensuring data can be applied to programs of the terminal 2 using a security check program stored in the data storage apparatus 1, when the terminal 2 that is brought into the company from outside is connected to a corporate system, the security of the terminal 2 is ensured. In addition, a spread of a virus or any other threat can be prevented when the terminal 2 having no security measure is connected to a corporate system. Furthermore, the security of the terminal 2 that has been taken out of the company for doing work can be easily checked by connecting the data storage apparatus 1 to the terminal 2, thereby reducing labor required for administrative tasks.

It should be noted that the processing in which the user selects pieces of security ensuring data to be applied has been described, another processing can be executed in which the application determination unit 24 in the terminal 2 instructs the data read unit 23 to read predetermined pieces of security ensuring data to be applied and the security application unit 25 applies the pieces of security ensuring data to the OS of the terminal without requiring user's intervention. In such a case, the application determination unit 24 may display a list of already-applied pieces of security ensuring data on the display unit.

After the pieces of security ensuring data are applied, the information obtaining unit 26 executes the processing for generating a security check file that describes a host name and an IP address of the terminal 2, time and date when the pieces of security ensuring data are applied, and the pieces of security ensuring data that have been actually applied, and writes the file to the data storage apparatus 1. In this manner, the security status check on the terminal 2 is completed.

Figure 5:
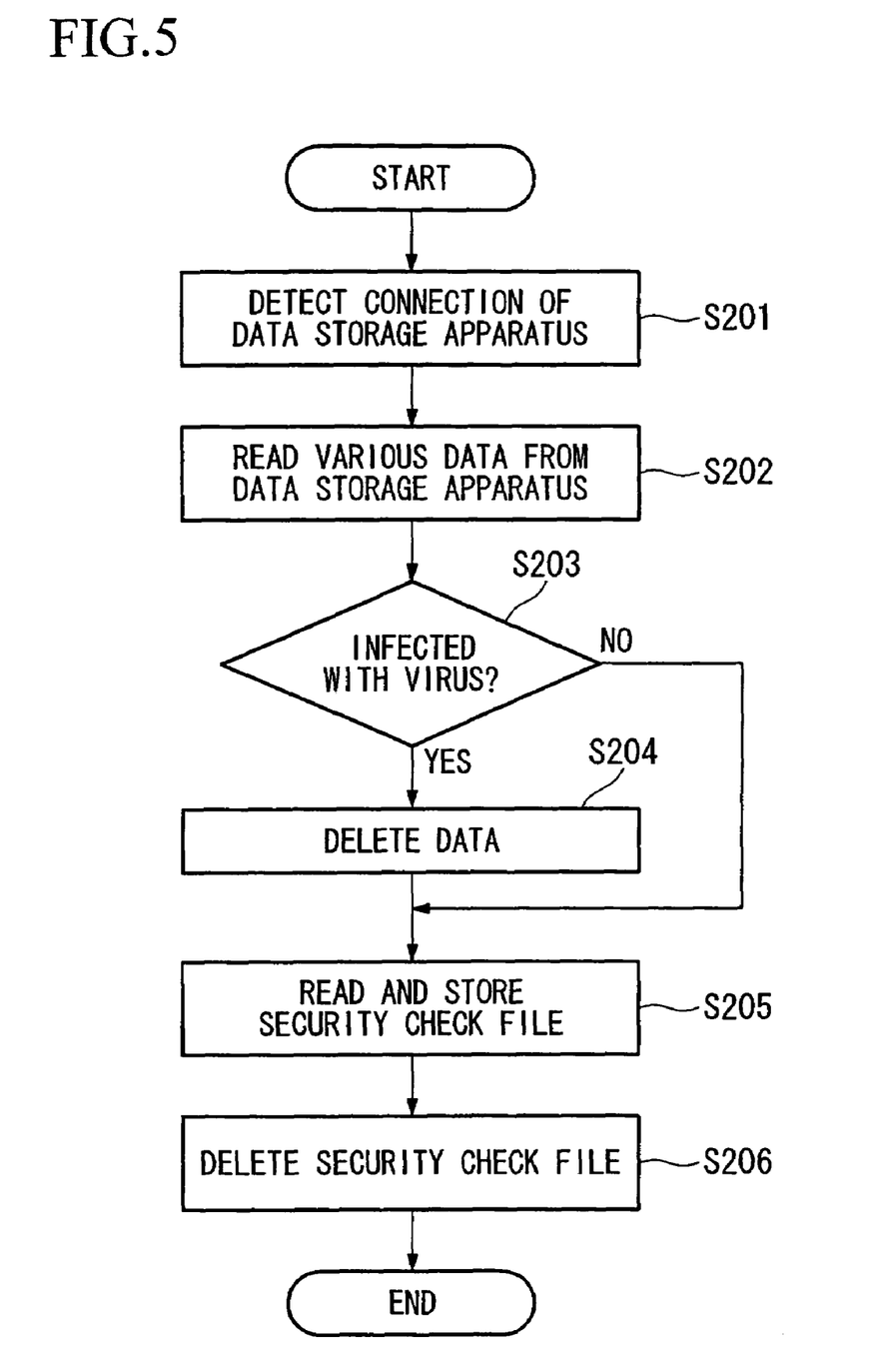
FIG. 5 is a diagram illustrating a processing flow of a security check on a data storage apparatus.

Next, the processing for checking the security of the data storage apparatus will be described.

FIG. 5 is a diagram illustrating a processing flow of a security check on the data storage apparatus.

A tight security is required for the data storage apparatus 1 that is used for checking the security of the terminal 2. Accordingly, the data storage apparatus 1 is kept secure under the surveillance of a system administrator or the like. The security of the data storage apparatus 1 is checked by the following processing.

First, an administrator connects the data storage apparatus 1 to the administrative server 3. In response, the connection detection unit 31 detects the connection of the data storage apparatus 1 (step S201). Then, the virus check unit 32 reads a check program, pieces of security ensuring data, a security ensuring list, general-purpose data, and a security check file written by the terminal 2, or the like, which are stored in the storage unit 11 in the data storage apparatus 1 (step S202), and determines whether or not any piece of data is infected by a virus by comparing them with security profiles (step S203). When virus infection is detected, the piece of data infected by the virus is deleted (step S204).

Upon completion of the virus check, the information obtainment and deletion unit 36 in the administrative server 3 reads and stores the security check file (step S205). In addition, the information obtainment and deletion unit 36 deletes the security check file stored in the data storage apparatus 1 (step S206). In the above-described processing, the security check on the data storage apparatus 1 can be carried out, and when the data storage apparatus 1 is used for a security check on the terminal 2, the terminal 2 that is undergone the security check can be managed by reading the security check file and using information described in this security check file.

Figure 6:
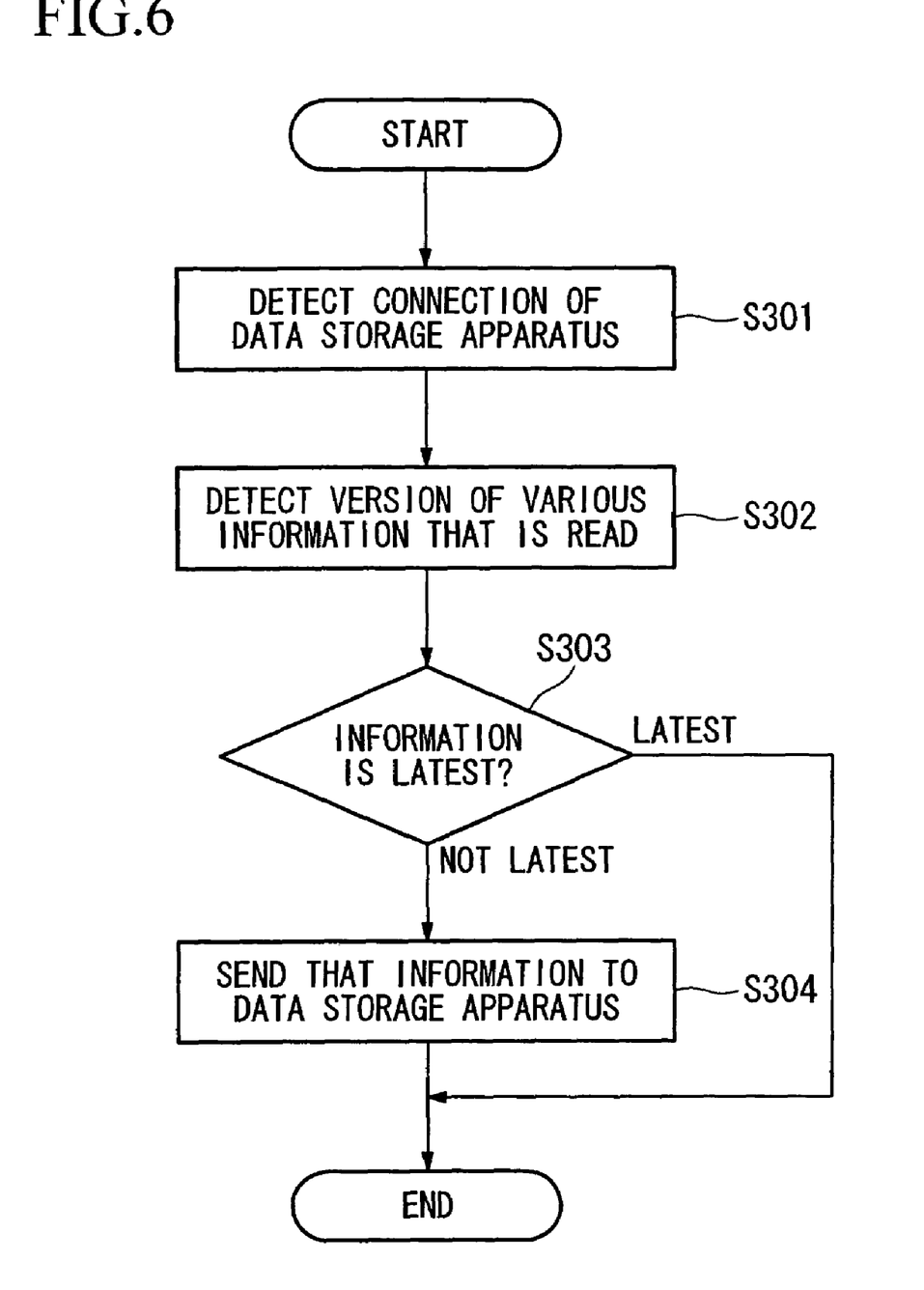
FIG. 6 is a diagram illustrating a processing flow of an update of security ensuring data in the data storage apparatus.

FIG. 6 is a diagram illustrating a processing flow of an update of security ensuring data in the data storage apparatus. Since the data storage apparatus 1 is an apparatus for ensuring the security of the terminal 2, the data storage apparatus 1 is required to have security ensuring data that can ensure a high level of security of programs that are to be protected. Thus, the administrator maintains latest pieces of security ensuring data using the following processing in order to keep the data storage apparatus 1 up-to-date.

First, the administrator connects the data storage apparatus 1 to the administrative server 3. In response, the connection detection unit 31 detects the connection of the data storage apparatus 1 (step S301). Then, the security ensuring data updating unit 33 reads a check program, pieces of security ensuring data, and a security ensuring data list stored in the data storage apparatus 1. The security ensuring data updating unit 33 detects the version information of the obtained information (step S302), and determines whether or not they are the latest ones by comparing the obtained version information with the stored version information, for example (step S303). Then, the information whose version is not latest is sent to the data storage apparatus 1 for updating (step S304). In the above-described processing, the programs to be checked in the terminal 2 are managed so that security ensuring data that can enhance the security level are maintained.

The various apparatuses described above have a computer system incorporated therewithin. The process steps described above are stored in a computer readable medium in the form of a program. The computer reads the program, and executes the process of these steps. The computer readable medium includes, but is not limited to, magnetic disks, magneto-optical disks, CD-ROMs, DVD-ROMs, and semiconductor memories. Alternatively, the computer program may be delivered to computers via a communication line, and a computer which has received the delivered program may execute the program.

In addition, the program described above may execute only a part of the processes descried above.

Furthermore, the program may be executed in combination with another program that has been stored in a computer system. Such a program is generally referred to as a difference file (difference program).

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A data storage apparatus that is connected to a terminal having a computer and stores a program executed by the computer of the terminal, the program making the computer execute the processing for:

reading from the data storage apparatus a security ensuring data list that describes an attribute of a piece of security ensuring data that is to be applied to a predetermined program of programs stored in the terminal;

determining, by executing a program read from the data storage apparatus, whether or not the piece of security ensuring data described in the security ensuring data list is applied to the predetermined program stored in the terminal by comparing an attribute of the piece of security described data described in the security ensuring list associated with information on the predetermined program and an attribute of a piece of security ensuring data that has been applied to the predetermined program stored in the terminal; and reading, when it is determined that the piece of security ensuring data described in the security ensuring data list is not applied to the predetermined program stored in the terminal, the piece of security ensuring data from the data storage apparatus by executing a program read from the data storage apparatus;

applying, by executing a program read from the data storage apparatus, the read piece of security ensuring data to the predetermined program stored in the terminal so as to update the predetermined program stored in the terminal; and obtaining attribute information of the terminal after the applying step is performed.

2. The data storage apparatus according to claim 1, further storing a program executed by the computer of the terminal, the program making the computer execute the processing for:

creating a list of the piece of security ensuring data that has been determined as not being applied; and instructing, before applying the piece of security ensuring data, to display the generated list of the unapplied piece of security ensuring data on the display unit, and to read from the data storage apparatus only a piece of security ensuring data that is selected to be applied in the list.

3. The data storage apparatus according to claim 1, further storing a program executed by the computer of the terminal, the program making the computer execute the processing for:

obtaining, after applying the piece of security ensuring data that has been determined as not being applied, attribute information of the terminal and outputting the information to the data storage apparatus.

4. A method for ensuring security of a computer of a terminal to which a data storage apparatus is connected, comprising:

reading a check program from the data storage apparatus;

reading, based on a list reading unit executing the check program, a security ensuring data list that describes an attribute of a piece of security ensuring data to be applied to a predetermined program;

determining, based on an application determination unit executing the check program, whether or not the piece of security ensuring data described in the security ensuring data list is applied to the predetermined program of programs stored in the terminal by comparing an attribute of the piece of security ensuring data described in the security ensuring list associated with information on the predetermined program stored in the data storage apparatus and an attribute of the piece of security ensuring data of the predetermined program that is applied to the terminal;

reading, when it is determined that the piece of security ensuring data described in the security ensuring data list is not applied to the predetermined program stored in the terminal, the piece of security ensuring data from a storage medium based on a data reading unit executing the check program;

applying, based on an applying program application unit executing the check program, the read piece of security ensuring data to the predetermined program stored in the terminal so as to update the predetermined program stored in the terminal: and obtaining attribute information of the terminal after the applying step is performed.

5. A security ensuring server comprising:

a connection detection unit that detects a connection of a data storage apparatus that stores a list of an attribute of a piece of security ensuring data to be applied to a predetermined program stored in the terminal for each predetermined program and a respective piece of security ensuring data corresponding to the attribute;

a latest information storage unit that stores a latest one of the list and a latest one of the piece of security ensuring data;

a latest information transmission unit that, when the list and the piece of security ensuring data stored in the detected data storage apparatus do not match corresponding information stored in the latest information storage unit, sends the data storage apparatus the list and the piece of security ensuring data stored in the latest information storage unit;

an updater that updates the piece of security ensuring data stored in the detected area storage apparatus that does not match the corresponding information stored in the latest information storage unit with the piece of security ensuring data stored in the latest information storage unit; and an obtaining unit that obtains attribute information of the terminal after updating the piece of security ensuring data.

6. The security ensuring server according to claim 5, further comprising:

a managed information storage unit that stores an attribute of a data storage apparatus to be managed; and a managed data storage apparatus determination unit that, when the attribute read from the data storage apparatus and an attribute of the data storage apparatus stored in the managed information storage unit do not match, that quits sending the list and the piece of security ensuring data.

7. The security ensuring server according to claim 6, further comprising an attribute storage unit that stores an attribute read from the data storage apparatus.

8. The security ensuring server according to claim 5, further comprising a deletion unit that deletes predetermined information stored in the data storage apparatus.

9. The security ensuring server according to claim 5, further comprising a virus check unit that checks each file stored in the data storage apparatus when a connection of the data storage apparatus is detected.

10. A storage medium storing a program executed by a computer of a security ensuring server, the program making the computer execute the processing for:

detecting a connection of a data storage apparatus that stores information of a list of an attribute of a piece of security ensuring data to be applied to a predetermined program stored in the terminal for each predetermined program and a respective piece of security ensuring data corresponding to the attribute;

sending, when the list and the piece of security ensuring data stored in the detected data storage apparatus do not match corresponding information stored in a latest information storage unit that stores a latest list and a latest piece of security ensuring data, the data storage apparatus the list and the piece of security ensuring data stored in that latest information storage unit;

updating the piece of security ensuring data stored in the detected data storage apparatus that does not match the corresponding information stored in the latest information storage unit with the piece of security ensuring data stored in the latest information storage unit; and obtaining attribute information of the terminal after the updating step is performed.

11. A method for ensuring security of a security ensuring server, comprising:

detecting a connection of a data storage apparatus that stores information of a list of an attribute of a piece of security ensuring data to be applied to a predetermined program stored in the terminal for each predetermined program and a respective piece of security ensuring data corresponding to the attribute;

storing, by a latest information storage unit, a latest one of the list and a latest one of the piece of security ensuring data;

sending, by a latest information transmission unit, when the list and the piece of security ensuring data stored in the detected data storage apparatus do not match corresponding information stored in the latest information storage unit, the data storage apparatus the list and the piece of security ensuring data stored in the latest information storage unit; and updating the piece of security ensuring data stored in the detected data storage apparatus that does not match the corresponding information stored in the latest information storage unit with the piece of security ensuring data stored in the latest information storage unit; and obtaining attribute information of the terminal after the updating step is performed.

* * * * *